US006937977B2

(12) United States Patent
Gerson

(10) Patent No.: US 6,937,977 B2
(45) Date of Patent: Aug. 30, 2005

(54) METHOD AND APPARATUS FOR PROCESSING AN INPUT SPEECH SIGNAL DURING PRESENTATION OF AN OUTPUT AUDIO SIGNAL

(75) Inventor: Ira A. Gerson, Schaumburg, IL (US)

(73) Assignee: fastmobile, Inc., Rolling Meadows, IL (US)

( * ) Notice: Subject to any disclaimer, the term of this patent is extended or adjusted under 35 U.S.C. 154(b) by 248 days.

(21) Appl. No.: 09/412,202

(22) Filed: Oct. 5, 1999

(65) Prior Publication Data

US 2003/0040903 A1 Feb. 27, 2003

(51) Int. Cl.[7] ................................................ G10L 19/00

(52) U.S. Cl. .................... 704/201; 704/270; 704/270.1; 704/275; 704/248; 704/263; 455/34.1; 455/31.1; 455/54.1; 379/410; 379/406; 379/88; 379/89; 379/67; 370/32.1; 370/110.1

(58) Field of Search ................................ 704/270, 278, 704/231, 248, 201, 258, 220, 228, 263, 250, 255, 247, 270.1; 455/34.1, 31.1, 54.1; 379/410, 406, 411, 88, 89, 67, 201, 202; 370/32.1, 32, 110.1

(56) References Cited

U.S. PATENT DOCUMENTS 4,253,157 A * 2/1981 Kirschner et al. ....... 379/93.25
4,821,325 A * 4/1989 Martin et al. ............... 704/253
4,914,692 A 4/1990 Hartwell et al.
5,150,387 A * 9/1992 Yoshikawa et al. ......... 375/240
5,155,760 A 10/1992 Johnson et al.
5,475,791 A 12/1995 Schalk et al.
5,644,310 A * 7/1997 Laczko et al. .............. 341/110
5,652,789 A 7/1997 Miner et al.
5,692,105 A * 11/1997 Leppanen et al. .......... 330/144
5,708,704 A * 1/1998 Fisher ................... 379/406.03
5,758,317 A 5/1998 Peterson et al.
5,765,130 A * 6/1998 Nguyen ...................... 704/231
5,778,073 A * 7/1998 Busching et al. ........... 380/274
5,910,976 A * 6/1999 Berthoud et al. .......... 379/1.01
6,088,597 A * 7/2000 Sato et al. .................. 370/360
6,098,043 A * 8/2000 Forest et al. ............. 379/88.01
6,236,715 B1 * 5/2001 Wong ...................... 379/88.01

OTHER PUBLICATIONS

"The Aurora Project"; Foundation for Intelligent Physical Agents ("FIPA"); Chris Ellis; http://drogo.cselt.stet.it/fipa/yorktown/nyws029.htm.

* cited by examiner

*Primary Examiner*—Vijay Chawan
(74) *Attorney, Agent, or Firm*—Gavrilovich, Dodd & Lindsey, LLP

(57) ABSTRACT

A start of an input speech signal is detected during presentation of an output audio signal and an input start time, relative to the output audio signal, is determined. The input start time is then provided for use in responding to the input speech signal. In another embodiment, the output audio signal has a corresponding identification. When the input speech signal is detected during presentation of the output audio signal, the identification of the output audio signal is provided for use in responding to the input speech signal. Information signals comprising data and/or control signals are provided in response to at least the contextual information provided, i.e., the input start time and/or the identification of the output audio signal. In this manner, the present invention accurately establishes a context of an input speech signal relative to an output audio signal regardless of the delay characteristics of the underlying communication system.

55 Claims, 6 Drawing Sheets

METHOD AND APPARATUS FOR PROCESSING AN INPUT SPEECH SIGNAL DURING PRESENTATION OF AN OUTPUT AUDIO SIGNAL

TECHNICAL FIELD

The present invention relates generally to communication systems incorporating speech recognition and, in particular, to a method and apparatus for "barge-in" processing of an input speech signal during presentation of an output audio signal.

BACKGROUND OF THE INVENTION

Speech recognition systems are generally known in the art, particularly in relation to telephony systems. U.S. Pat. Nos. 4,914,692; 5,475,791; 5,708,704; and 5,765,130 illustrate exemplary telephone networks that incorporate speech recognition systems. A common feature of such systems is that the speech recognition element (i.e., the device or devices performing speech recognition) is typically centrally located within the fabric of the telephone network, as opposed to at the subscriber's communication device (i.e., the user's telephone). In a typical application, a combination of speech synthesis and speech recognition elements is deployed within a telephone network or infrastructure. Callers may access the system and, via the speech synthesis element, be presented with informational prompts or queries in the form of synthesized or recorded speech. A caller will typically provide a spoken response to the synthesized speech and the speech recognition element will process the caller's spoken response in order to provide further service to the caller.

Given human nature and the design of some speech synthesis/recognition systems, the spoken responses provided by a caller will often occur during the presentation of an output audio signal, for example, a synthesized speech prompt. The processing of such occurrences is often referred to as "barge-in" processing. U.S. Pat. Nos. 4,914,692; 5,155,760; 5,475,791; 5,708,704; and 5,765,130 all describe techniques for barge-in processing. Generally, the techniques described in each of these patents address the need for echo cancellation during barge-in processing. That is, during the presentation of a synthesized speech prompt (i.e., an output audio signal), the speech recognition system must account for residual artifacts from the prompt being present in any spoken response provided by the user (i.e., an input speech signal) in order to effectively perform speech recognition analysis. Thus, these prior art techniques are generally directed to the quality of input speech signals during barge-in processing. Due to the relatively small latencies or delays found in voice telephony systems, these prior art techniques generally are not concerned with context determination aspects of barge-in processing, i.e., correlating an input speech signal to a particular output audio signal or to a particular moment within an output audio signal.

This deficiency of the prior art is even more pronounced with regard to wireless systems. Although a substantial body of prior art exists regarding telephony-based speech recognition systems, the incorporation of speech recognition systems into wireless communication systems is a relatively new development. In an effort to standardize the application of speech recognition in wireless communication environments, work has recently been initiated by the European Telecommunications Standards Institute (ETSI) on the so-called Aurora Project. A goal of the Aurora Project is to define a global standard for distributed speech recognition systems. Generally, the Aurora Project is proposing to establish a client-server arrangement in which front-end speech recognition processing, such as feature extraction or parameterization, is performed within a subscriber unit (e.g., a hand-held wireless communication device such as a cellular telephone). The data provided by the front-end would then be conveyed to a server to perform back-end speech recognition processing.

It is anticipated that the client-server arrangement being proposed by the Aurora Project will adequately address the needs for a distributed speech recognition system. However, it is uncertain at this time how barge-in processing will be addressed, if at all, by the Aurora Project. This is a particular concern given the wider variation in latencies typically encountered in wireless systems and the effect that such latencies could have on barge-in processing. For example, it is not uncommon for the processing of a user's speech-based response to be based in part upon the particular point in time at which it was received by the speech recognition processor. That is, it can make a difference whether a user's response is received during a particular part of a given synthesized prompt or, if a series of discrete prompts are provided, during which prompt the response was received. In short, the context of a user's response can be as equally important as recognizing the informational content of the user's response. However, the uncertain delay characteristics of some wireless systems stands as an impediment to properly determining such contexts. Thus, it would be advantageous to provide techniques for determining a context of an input speech signal during the presentation of an output audio signal, particularly in systems having uncertain and/or widely varying delay characteristics, such as those utilizing packet data communications.

SUMMARY OF THE INVENTION

The present invention provides a technique for processing an input speech signal during the presentation of an output audio signal. Although principally applicable to wireless communication systems, the techniques of the present invention may be beneficially applied to any communication system having uncertain and/or widely varying delay characteristics, for example, a packet-data system, such as the Internet. In accordance with one embodiment of the present invention, a start of an input speech signal is detected during presentation of an output audio signal and an input start time, relative to the output audio signal, is determined. The input start time is then provided for use in responding to the input speech signal. In another embodiment, the output audio signal has a corresponding identification. When the input speech signal is detected during presentation of the output audio signal, the identification of the output audio signal is provided for use in responding to the input speech signal. Information signals comprising data and/or control signals are provided in response to at least the contextual information provided, i.e., the input start time and/or the identification of the output audio signal. In this manner, the present invention provides a technique for accurately establishing a context of an input speech signal relative to an output audio signal regardless of the delay characteristics of the underlying communication system.

DETAILED DESCRIPTION OF THE PREFERRED EMBODIMENT

Figure 1:
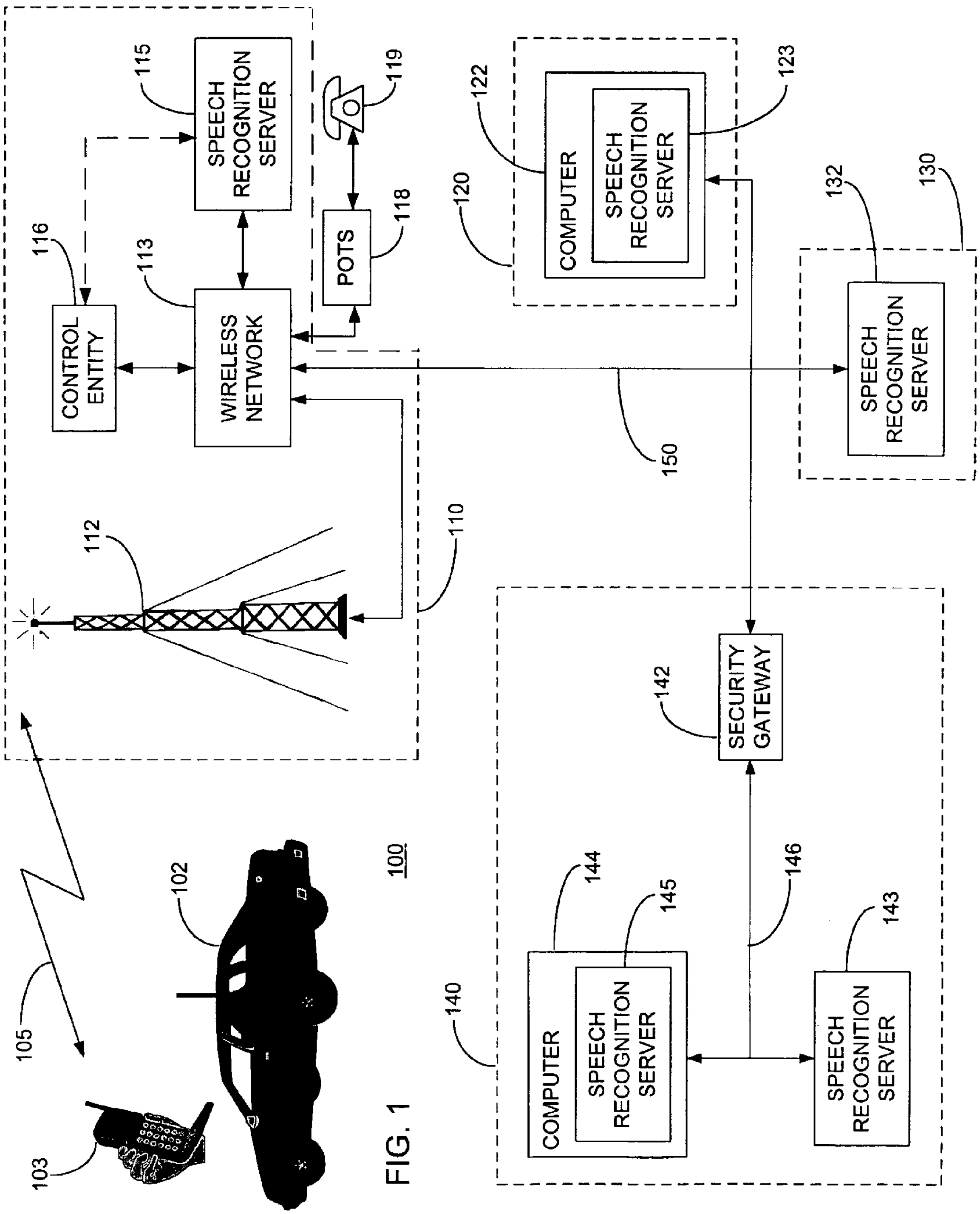
FIG. 1 is a block diagram of a wireless communications system in accordance with the present invention.

The present invention may be more fully described with reference to FIGS. 1–9. FIG. 1 illustrates the overall system architecture of a wireless communication system 100 comprising subscriber units 102–103. The subscriber units 102–103 communicate with an infrastructure via a wireless channel 105 supported by a wireless system 110. The infrastructure of the present invention may comprise, in addition to the wireless system 110, any of a small entity system 120, a content provider system 130 and an enterprise system 140 coupled together via a data network 150.

The subscriber units may comprise any wireless communication device, such as a handheld cellphone 103 or a wireless communication device residing in a vehicle 102, capable of communicating with a communication infrastructure. It is understood that a variety of subscriber units, other than those shown in FIG. 1, could be used; the present invention is not limited in this regard. The subscriber units 102–103 preferably include the components of a hands-free cellular phone, for hands-free voice communication, a local speech recognition and synthesis system, and the client portion of a client-server speech recognition and synthesis system. These components are described in greater detail below with respect to FIGS. 2 and 3.

The subscriber units 102–103 wirelessly communicate with the wireless system 110 via the wireless channel 105. The wireless system 110 preferably comprises a cellular system, although those having ordinary skill in the art will recognize that the present invention may be beneficially applied to other types of wireless systems supporting voice communications. The wireless channel 105 is typically a radio frequency (RF) carrier implementing digital transmission techniques and capable of conveying speech and/or data both to and from the subscriber units 102–103. It is understood that other transmission techniques, such as analog techniques, may also be used. In a preferred embodiment, the wireless channel 105 is a wireless packet data channel, such as the General Packet Data Radio Service (GPRS) defined by the European Telecommunications Standards Institute (ETSI). The wireless channel 105 transports data to facilitate communication between a client portion of the client-server speech recognition and synthesis system, and the server portion of the client-server speech recognition and synthesis system. Other information, such as display, control, location, or status information can also be transported across the wireless channel 105.

The wireless system 110 comprises an antenna 112 that receives transmissions conveyed by the wireless channel 105 from the subscriber units 102–103. The antenna 112 also transmits to the subscriber units 102–103 via the wireless channel 105. Data received via the antenna 112 is converted to a data signal and transported to the wireless network 113. Conversely, data from the wireless network 113 is sent to the antenna 112 for transmission. In the context of the present invention, the wireless network 113 comprises those devices necessary to implement a wireless system, such as base stations, controllers, resource allocators, interfaces, databases, etc. as generally known in the art. As those having ordinary skill the art will appreciate, the particular elements incorporated into the wireless network 113 is dependent upon the particular type of wireless system 110 used, e.g., a cellular system, a trunked land-mobile system, etc.

A speech recognition server 115 providing a server portion of a client-server speech recognition and synthesis system may be coupled to the wireless network 113 thereby allowing an operator of the wireless system 110 to provide speech-based services to users of the subscriber units 102–103. A control entity 116 may also be coupled to the wireless network 113. The control entity 116 can be used to send control signals, responsive to input provided by the speech recognition server 115, to the subscriber units 102–103 to control the subscriber units or devices interconnected to the subscriber units. As shown, the control entity 116, which may comprise any suitably programmed general purpose computer, may be coupled to the speech recognition server 115 either through the wireless network 113 or directly, as shown by the dashed interconnection.

As noted above, the infrastructure of the present invention can comprise a variety of systems 110, 120, 130, 140 coupled together via a data network 150. A suitable data network 150 may comprise a private data network using known network technologies, a public network such as the Internet, or a combination thereof. As alternatives, or in addition to, the speech recognition server 115 within the wireless system 110, remote speech recognition servers 123, 132, 143, 145 may be connected in various ways to the data network 150 to provide speech-based services to the subscriber units 102–103. The remote speech recognition servers, when provided, are similarly capable of communicating to with the control entity 116 through the data network 150 and any intervening communication paths.

A computer 122, such as a desktop personal computer or other general-purpose processing device, within a small entity system 120 (such as a small business or home) can be used to implement a speech recognition server 123. Data to and from the subscriber units 102–103 is routed through the wireless system 110 and the data network 150 to the computer 122. Executing stored software algorithms and processes, the computer 122 provides the functionality of the speech recognition server 123, which, in the preferred embodiment, includes the server portions of both a speech recognition system and a speech synthesis system. Where, for example, the computer 122 is a user's personal computer, the speech recognition server software on the computer can be coupled to the user's personal information residing on the computer, such as the user's email, telephone book, calendar, or other information. This configuration would allow the user of a subscriber unit to access personal information on their personal computer utilizing a voice-based interface. The client portions of the client-server speech recognition and speech synthesis systems in accordance with the present invention are described in conjunction with FIGS. 2 and 3 below. The server portions of the client-server speech recognition and speech synthesis systems in accordance with the present invention are described in conjunction with FIGS. 4 and 5 below.

Alternatively, a content provider 130, which has information it would like to make available to users of subscriber units, can connect a speech recognition server 132 to the data network. Offered as a feature or special service, the speech recognition server 132 provides a voice-based interface to users of subscriber units desiring access to the content provider's information (not shown).

Another possible location for a speech recognition server is within an enterprise 140, such as a large corporation or similar entity. The enterprise's internal network 146, such as an Intranet, is connected to the data network 150 via security gateway 142. The security gateway 142 provides, in conjunction with the subscriber units, secure access to the enterprise's internal network 146. As known in the art, the secure access provided in this manner typically rely, in part, upon authentication and encryption technologies. In this manner, secure communications between subscriber units and an internal network 146 via an unsecured data network 150 are provided. Within the enterprise 140, server software implementing a speech recognition server 145 can be provided on a personal computer 144, such as a given employee's workstation. Similar to the configuration described above for use in small entity systems, the workstation approach allows an employee to access work-related or other information through a voice-based interface. Also, similar to the content provider 130 model, the enterprise 140 can provide an internally available speech recognition server 143 to provide access to enterprise databases.

Regardless of where the speech recognition servers of the present invention are deployed, they can be used to implement a variety of speech-based services. For example, operating in conjunction with the control entity 116, when provided, the speech recognition servers enable operational control of subscriber units or devices coupled to the subscriber units. It should be noted that the term speech recognition server, as used throughout this description, is intended to include speech synthesis functionality as well.

The infrastructure of the present invention also provides interconnections between the subscriber units 102–103 and normal telephony systems. This is illustrated in FIG. 1 by the coupling of the wireless network 113 to a POTS (plain old telephone system) network 118. As known in the art, the POTS network 118, or similar telephone network, provides communication access to a plurality of calling stations 119, such as landline telephone handsets or other wireless devices. In this manner, a user of a subscriber unit 102–103 can carry on voice communications with another user of a calling station 119.

Figure 2:
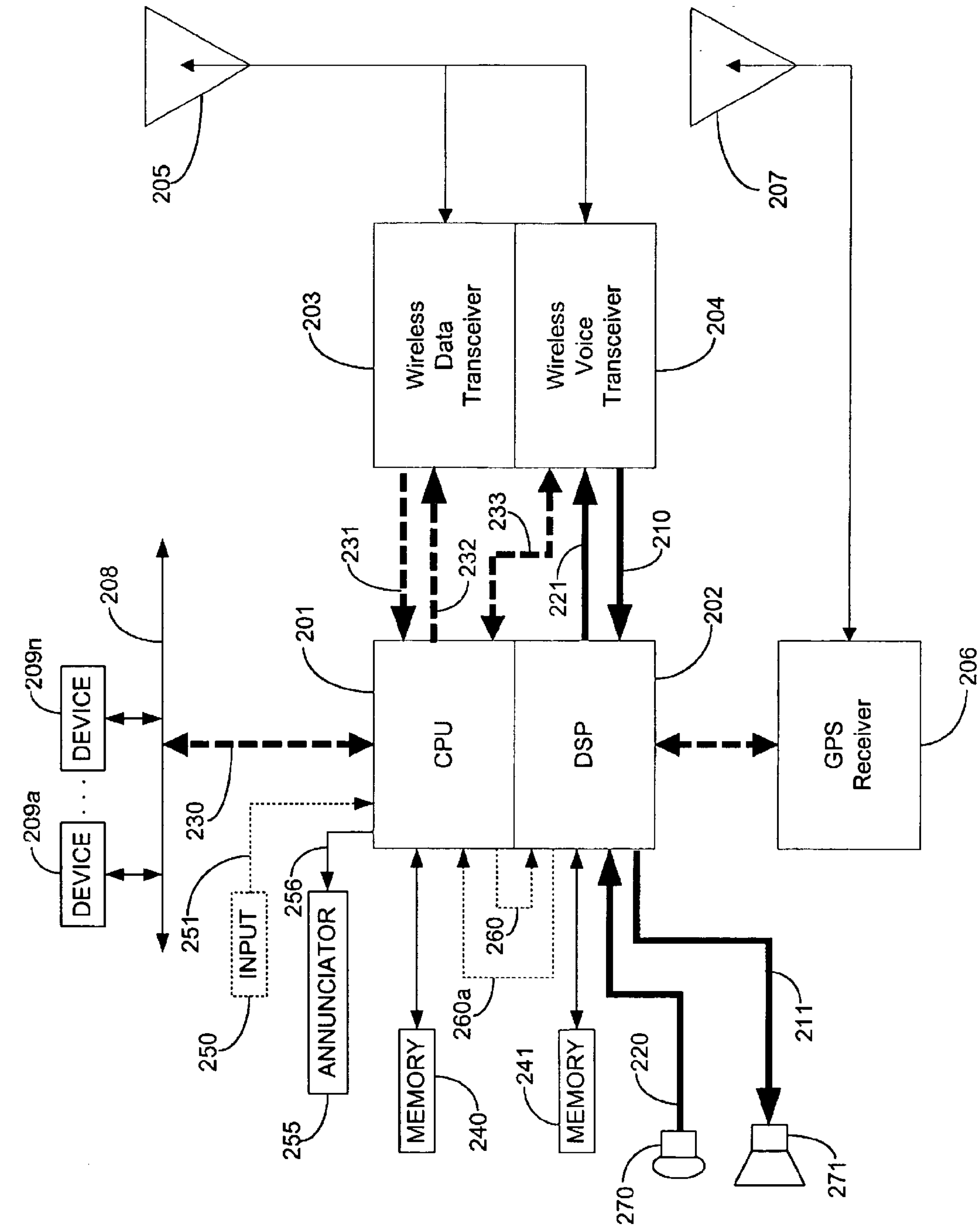
FIG. 2 is a block diagram of a subscriber unit in accordance with the present invention.

FIG. 2 illustrates a hardware architecture that may be used to implement a subscriber unit in accordance with the present invention. As shown, two wireless transceivers may be used: a wireless data transceiver 203, and a wireless voice transceiver 204. As known in the art, these transceivers may be combined into a single transceiver that can perform both data and voice functions. The wireless data transceiver 203 and the wireless speech transceiver 204 are both connected to an antenna 205. Alternatively, separate antennas for each transceiver may also be used. The wireless voice transceiver 204 performs all necessary signal processing, protocol termination, modulation/demodulation, etc. to provide wireless voice communication and, in the preferred embodiment, comprises a cellular transceiver. In a similar manner, the wireless data transceiver 203 provides data connectivity with the infrastructure. In a preferred embodiment, the wireless data transceiver 203 supports wireless packet data, such as the General Packet Data Radio Service (GPRS) defined by the European Telecommunications Standards Institute (ETSI).

It is anticipated that the present invention can be applied with particular advantage to in-vehicle systems, as discussed below. When employed in-vehicle, a subscriber unit in accordance with the present invention also includes processing components that would generally be considered part of the vehicle and not part of the subscriber unit. For the purposes of describing the instant invention, it is assumed that such processing components are part of the subscriber unit. It is understood that an actual implementation of a subscriber unit may or may not include such processing components as dictated by design considerations. In a preferred embodiment, the processing components comprise a general-purpose processor (CPU) 201, such as a "POWER PC" by IBM Corp., and a digital signal processor (DSP) 202, such as a DSP56300 series processor by Motorola Inc. The CPU 201 and the DSP 202 are shown in contiguous fashion in FIG. 2 to illustrate that they are coupled together via data and address buses, as well as other control connections, as known in the art. Alternative embodiments could combine the functions for both the CPU 201 and the DSP 202 into a single processor or split them into several processors. Both the CPU 201 and the DSP 202 are coupled to a respective memory 240, 241 that provides program and data storage for its associated processor. Using stored software routines, the CPU 201 and/or the DSP 202 can be programmed to implement at least a portion of the functionality of the present invention. Software functions of the CPU 201 and DSP 202 will be described, at least in part, with regard to FIGS. 3 and 7 below.

In a preferred embodiment, subscriber units also include a global positioning satellite (GPS) receiver 206 coupled to an antenna 207. The GPS receiver 206 is coupled to the DSP 202 to provide received GPS information. The DSP 202 takes information from GPS receiver 206 and computes location coordinates of the wireless communications device. Alternatively the GPS receiver 206 may provide location information directly to the CPU 201.

Various inputs and outputs of the CPU 201 and DSP 202 are illustrated in FIG. 2. As shown in FIG. 2, the heavy solid lines correspond to voice-related information, and the heavy dashed lines correspond to control/data-related information. Optional elements and signal paths are illustrated using dotted lines. The DSP 202 receives microphone audio 220 from a microphone 270 that provides voice input for both telephone (cellphone) conversations and voice input to both a local speech recognizer and a client-side portion of a client-server speech recognizer, as described in further detail below. The DSP 202 is also coupled to output audio 211 which is directed to at least one speaker 271 that provides voice output for telephone (cellphone) conversations and voice output from both a local speech synthesizer and a client-side portion of a client-server speech synthesizer. Note that the microphone 270 and the speaker 271 may be proximally located together, as in a handheld device, or may be distally located relative to each other, as in an automotive application having a visor-mounted microphone and a dash or door-mounted speaker.

In one embodiment of the present invention, the CPU 201 is coupled through a bi-directional interface 230 to an in-vehicle data bus 208. This data bus 208 allows control and status information to be communicated between various devices 209*a–n* in the vehicle, such as a cellphone, entertainment system, climate control system, etc. and the CPU 201. It is expected that a suitable data bus 208 will be an ITS Data Bus (IDB) currently in the process of being standardized by the Society of Automotive Engineers. Alternative means of communicating control and status information between various devices may be used such as the short-range, wireless data communication system being defined by the Bluetooth Special Interest Group (SIG). The data bus 208 allows the CPU 201 to control the devices 209 on the vehicle data bus in response to voice commands recognized either by a local speech recognizer or by the client-server speech recognizer.

CPU 201 is coupled to the wireless data transceiver 203 via a receive data connection 231 and a transmit data connection 232. These connections 231–232 allow the CPU 201 to receive control information and speech-synthesis information sent from the wireless system 110. The speech-synthesis information is received from a server portion of a client-server speech synthesis system via the wireless data channel 105. The CPU 201 decodes the speech-synthesis information that is then delivered to the DSP 202. The DSP 202 then synthesizes the output speech and delivers it to the audio output 211. Any control information received via the receive data connection 231 may be used to control operation of the subscriber unit itself or sent to one or more of the devices in order to control their operation. Additionally, the CPU 201 can send status information, and the output data from the client portion of the client-server speech recognition system, to the wireless system 110. The client portion of the client-server speech recognition system is preferably implemented in software in the DSP 202 and the CPU 201, as described in greater detail below. When supporting speech recognition, the DSP 202 receives speech from the microphone input 220 and processes this audio to provide a parameterized speech signal to the CPU 201. The CPU 201 encodes the parameterized speech signal and sends this information to the wireless data transceiver 203 via the transmit data connection 232 to be sent over the wireless data channel 105 to a speech recognition server in the infrastructure.

The wireless voice transceiver 204 is coupled to the CPU 201 via a bidirectional data bus 233. This data bus allows the CPU 201 to control the operation of the wireless voice transceiver 204 and receive status information from the wireless voice transceiver 204. The wireless voice transceiver 204 is also coupled to the DSP 202 via a transmit audio connection 221 and a receive audio connection 210. When the wireless voice transceiver 204 is being used to facilitate a telephone (cellular) call, audio is received from the microphone input 220 by the DSP 202. The microphone audio is processed (e.g., filtered, compressed, etc.) and provided to the wireless voice transceiver 204 to be transmitted to the cellular infrastructure. Conversely, audio received by wireless voice transceiver 204 is sent via the receive audio connection 210 to the DSP 202 where the audio is processed (e.g., decompressed, filtered, etc.) and provided to the speaker output 211. The processing performed by the DSP 202 will be described in greater detail with regard to FIG. 3.

The subscriber unit illustrated in FIG. 2 may optionally comprise an input device 250 for use in manually providing an interrupt indicator 251 during a voice communication. That is, during a voice conversation, a user of the subscriber unit can manually activate the input device to provide an interrupt indicator, thereby signaling the user's desire to wake up speech recognition functionality. For example, during a voice communication, the user of the subscriber unit may wish to interrupt the conversation in order to provide speech-based commands to an electronic attendant, e.g., to dial up and add a third party to the call. The input device 250 may comprise virtually any type of user-activated input mechanism, particular examples of which include a single or multipurpose button, a multi-position selector or a menu-driven display with input capabilities. Alternatively, the input device 250 may be connected to the CPU 201 via the bi-directional interface 230 and the in-vehicle data bus 208. Regardless, when such an input device 250 is provided, the CPU 201 acts as a detector to identify the occurrence of the interrupt indicator. When the CPU 201 acts as a detector for the input device 250, the CPU 201 indicates the presence of the interrupt indicator to the DSP 202, as illustrated by the signal path identified by the reference numeral 260. Conversely, another implementation uses a local speech recognizer (preferably implemented within the DSP 202 and/or CPU 201) coupled to a detector application to provide the interrupt indicator. In that case, either the CPU 201 or the DSP 202 would signal the presence of the interrupt indicator, as represented by the signal path identified by the reference numeral 260*a*. Regardless, once the presence of the interrupt indicator has been detected, a portion of a speech recognition element (preferably the client portion implemented in conjunction with or as part of the subscriber unit) is activated to begin processing voice based commands. Additionally, an indication that the portion of the speech recognition element has been activated may also be provided to the user and to a speech recognition server. In a preferred embodiment, such an indication is conveyed via the transmit data connection 232 to the wireless data transceiver 203 for transmission to a speech recognition server cooperating with the speech recognition client to provide the speech recognition element.

Finally, the subscriber unit is preferably equipped with an annunciator 255 for providing an indication to a user of the subscriber unit in response to annunciator control 256 that the speech recognition functionality has been activated in response to the interrupt indicator. The annunciator 255 is activated in response to the detection of the interrupt indicator, and may comprise a speaker used to provide an audible indication, such as a limited-duration tone or beep. (Again, the presence of the interrupt indicator can be signaled using either the input device-based signal 260 or the speech-based signal 260*a*.) In another implementation, the functionality of the annunciator is provided via a software program executed by the DSP 202 that directs audio to the speaker output 211. The speaker may be separate from or the same as the speaker 271 used to render the audio output 211 audible. Alternatively, the annunciator 255 may comprise a display device, such as an LED or LCD display, that provides a visual indicator. The particular form of the annunciator 255 is a matter of design choice, and the present invention need not be limited in this regard. Further still, the annunciator 255 may be connected to the CPU 201 via the bi-directional interface 230 and the in-vehicle data bus 208.

Figure 3:
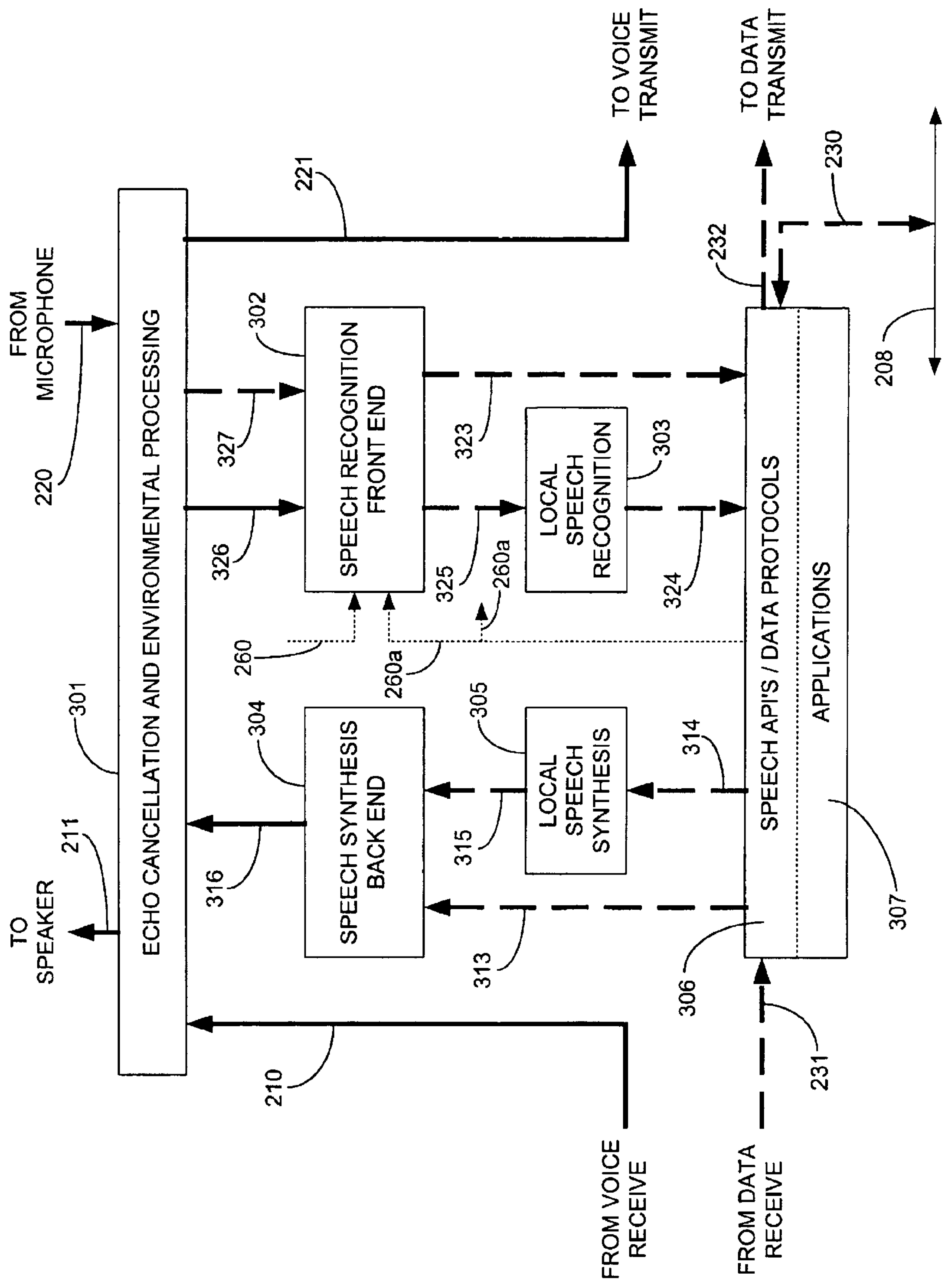
FIG. 3 is a schematic illustration of voice and data processing functionality within a subscriber unit in accordance with the present invention.

Referring now to FIG. 3, a portion of the processing performed within subscriber units (operating in accordance with the present invention) is schematically illustrated. Preferably, the processing illustrated in FIG. 3 is implemented using stored, machine-readable instructions executed by the CPU 201 and/or the DSP 202. The discussion presented below describes the operation of a subscriber unit deployed within an automotive vehicle. However, the functionality generally illustrated in FIG. 3 and described herein is equally applicable to non-vehicle-based applications that use, or could benefit from the use of, speech recognition.

Microphone audio 220 is provided as an input to the subscriber unit. In an automotive environment, the microphone would be a hands-free microphone typically mounted on or near the visor or steering column of the vehicle. Preferably, the microphone audio 220 arrives at the echo cancellation and environmental processing (ECEP) block 301 in digital form. The speaker audio 211 is delivered to the speaker(s) by the ECEP block 301 after undergoing any necessary processing. In a vehicle, such speakers can be mounted under the dashboard. Alternatively, the speaker audio 211 can be routed through an in-vehicle entertainment system to be played through the entertainment system's speaker system. The speaker audio 211 is preferably in a digital format. When a cellular phone call, for example, is in progress, received audio from the cellular phone arrives at the ECEP block 301 via the receive audio connection 210. Likewise, transmit audio is delivered to the cell phone over the transmit audio connection 221.

The ECEP block 301 provides echo cancellation of speaker audio 211 from the microphone audio 220 before delivery, via the transmit audio connection 221, to the wireless voice transceiver 204. This form of echo cancellation is known as acoustic echo cancellation and is well known in the art. For example, U.S. Pat. No. 5,136,599 issued to Amano et al. and titled "Sub-band Acoustic Echo Canceller", and U.S. Pat. No. 5,561,668 issued to Genter and entitled "Echo Canceler with Subband Attenuation and Noise Injection Control" teach suitable techniques for performing acoustic echo cancellation, the teachings of which patents are hereby incorporated by this reference.

The ECEP block 301 also provides, in addition to echo-cancellation, environmental processing to the microphone audio 220 in order to provide a more pleasant voice signal to the party receiving the audio transmitted by the subscriber unit. One technique that is commonly used is called noise suppression. The hands-free microphone in a vehicle will typically pick up many types of acoustic noise that will be heard by the other party. This technique reduces the perceived background noise that the other party hears and is described, for example, in U.S. Pat. No. 4,811,404 issued to Vilmur et al., the teachings of which patent are hereby incorporated by this reference.

The ECEP block 301 also provides echo-cancellation processing of synthesized speech provided by the speech-synthesis back end 304 via a first audio path 316, which synthesized speech is to be delivered to the speaker(s) via the audio output 211. As in the case with received voice routed to the speaker(s), the speaker audio "echo" which arrives on the microphone audio path 220 is cancelled out. This allows speaker audio that is acoustically coupled to the microphone to be eliminated from the microphone audio before being delivered to the speech recognition front end 302. This type of processing enables what is known in the art as "barge-in". Barge-in allows a speech recognition system to respond to input speech while output speech is simultaneously being generated by the system. Examples of "barge-in" implementations can be found, for example, in U.S. Pat. Nos. 4,914,692; 5,475,791; 5,708,704; and 5,765,130. Application of the present invention to barge-in processing is described in greater detail below.

Echo-cancelled microphone audio is supplied to a speech recognition front end 302 via a second audio path 326 whenever speech recognition processing is being performed. Optionally, ECEP block 301 provides background noise information to the speech recognition front end 302 via a first data path 327. This background noise information can be used to improve recognition performance for speech recognition systems operating in noisy environments. A suitable technique for performing such processing is described in U.S. Pat. No. 4,918,732 issued to Gerson et al., the teachings of which patent are hereby incorporated by this reference.

Based on the echo-cancelled microphone audio and, optionally, the background noise information received from the ECEP block 301, the speech recognition front-end 302 generates parameterized speech information. Together, the speech recognition front-end 302 and the speech synthesis back-end 304 provide the core functionality of a client-side portion of a client-server based speech recognition and synthesis system. Parameterized speech information is typically in the form of feature vectors, where a new vector is computed every 10 to 20 msec. One commonly used technique for the parameterization of a speech signal is mel cepstra as described by Davis et al. in "Comparison Of Parametric Representations For Monosyllabic Word Recognition In Continuously Spoken Sentences," IEEE Transactions on Acoustics Speech and Signal Processing, ASSP-28 (4), pp. 357–366, August 1980, the teachings of which publication are hereby incorporated by this reference.

The parameter vectors computed by the speech recognition front-end 302 are passed to a local speech recognition block 303 via a second data path 325 for local speech recognition processing. The parameter vectors are also optionally passed, via a third data path 323, to a protocol processing block 306 comprising speech application protocol interfaces (API's) and data protocols. In accordance with known techniques, the processing block 306 sends the parameter vectors to the wireless data transceiver 203 via the transmit data connection 232. In turn, the wireless data transceiver 203 conveys the parameter vectors to a server functioning as a part of the client-server based speech recognizer. (It is understood that the subscriber unit, rather than sending parameter vectors, can instead send speech information to the server using either the wireless data transceiver 203 or the wireless voice transceiver 204. This may be done in a manner similar to that which is used to support transmission of speech from the subscriber unit to the telephone network, or using other adequate representations of the speech signal. That is, the speech information may comprise any of a variety of unparameterized representations: raw digitized audio, audio that has been processed by a cellular speech coder, audio data suitable for transmission according to a specific protocol such as IP (Internet Protocol), etc. In turn, the server can perform the necessary parameterization upon receiving the unparameterized speech information.) While a single speech recognition front-end 302 is shown, the local speech recognizer 303 and the client-server based speech recognizer may in fact utilize different speech recognition front-ends.

The local speech recognizer 303 receives the parameter vectors 325 from the speech recognition front-end 302 and performs speech recognition analysis thereon, for example, to determine whether there are any recognizable utterances within the parameterized speech. In one embodiment, the recognized utterances (typically, words) are sent from the local speech recognizer 303 to the protocol processing block 306 via a fourth data path 324, which in turn passes the recognized utterances to various applications 307 for further processing. The applications 307, which may be implemented using either or both of the CPU 201 and DSP 202, can include a detector application that, based on recognized utterances, ascertains that a speech-based interrupt indicator has been received. For example, the detector compares the recognized utterances against a list of predetermined utterances (e.g., "wake up") searching for a match. When a match is detected, the detector application issues a signal 260*a* signifying the presence of the interrupt indicator. The presence of the interrupt indicator, in turn, is used to activate a portion of speech recognition element to begin processing voice-based commands. This is schematically illustrated in FIG. 3 by the signal 260*a* being fed to the speech recognition front end. In response, the speech recognition front end 302 would either continue routing parameterized audio to the local speech recognizer or, preferably, to the protocol processing block 306 for transmission to a speech recognition server for additional processing. (Note also that the input device-based signal 260, optionally provided by the input device 250, may also serve the same function.) Additionally, the presence of the interrupt indicator may be sent to transmit data connection 232 to alert an infrastructure-based element of a speech recognizer.

The speech synthesis back end 304 takes as input a parametric representation of speech and converts the parametric representation to a speech signal which is then delivered to ECEP block 301 via the first audio path 316. The particular parametric representation used is a matter of design choice. One commonly used parametric representation is formant parameters as described in Klatt, "Software For A Cascade/Parallel Formant Synthesizer", Journal of the Acoustical Society of America, Vol. 67, 1980, pp. 971–995. Linear prediction parameters are another commonly used parametric representation as discussed in Markel et al., Linear Prediction of Speech, Springer Verlag, New York, 1976. The respective teachings of the Klatt and Markel et al. publications are incorporated herein by this reference.

In the case of client-server based speech synthesis, the parametric representation of speech is received from the network via the wireless channel 105, the wireless data transceiver 203 and the protocol processing block 306, where it is forwarded to the speech synthesis back-end via a fifth data path 313. In the case of local speech synthesis, an application 307 would generate a text string to be spoken. This text string would be passed through the protocol processing block 306 via a sixth data path 314 to a local speech synthesizer 305. The local speech synthesizer 305 converts the text string into a parametric representation of the speech signal and passes this parametric representation via a seventh data path 315 to the speech synthesis back-end 304 for conversion to a speech signal.

It should be noted that the receive data connection 231 can be used to transport other received information in addition to speech synthesis information. For example, the other received information may include data (such as display information) and/or control information received from the infrastructure, and code to be downloaded into the system. Likewise, the transmit data connection 232 can be used to transport other transmit information in addition to the parameter vectors computed by the speech recognition front-end 302. For example, the other transmit information may include device status information, device capabilities, and information related to barge-in timing.

Figure 4:
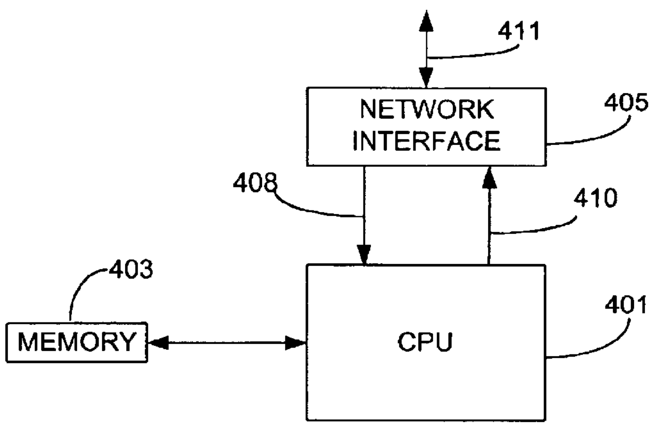
FIG. 4 is a block diagram of a speech recognition server in accordance with the present invention.

Referring now to FIG. 4, there is illustrated a hardware embodiment of a speech recognition server that provides the server portion of the client-server speech recognition and synthesis system in accordance with the present invention. This server can reside in several environments as described above with regard to FIG. 1. Data communication with subscriber units or a control entity is enabled through an infrastructure or network connection 411. This connection 411 may be local to, for example, a wireless system and connected directly to a wireless network, as shown in FIG. 1. Alternatively, the connection 411 may be to a public or private data network, or some other data communications link; the present invention is not limited in this regard.

A network interface 405 provides connectivity between a CPU 401 and the network connection 411. The network interface 405 routes data from the network 411 to CPU 401 via a receive path 408, and from the CPU 401 to the network connection 411 via a transmit path 410. As part of a client-server arrangement, the CPU 401 communicates with one or more clients (preferably implemented in subscriber units) via the network interface 405 and the network connection 411. In a preferred embodiment, the CPU 401 implements the server portion of the client-server speech recognition and synthesis system. Although not shown, the server illustrated in FIG. 4 may also comprise a local interface allowing local access to the server thereby facilitating, for example, server maintenance, status checking and other similar functions.

A memory 403 stores machine-readable instructions (software) and program data for execution and use by the CPU 401 in implementing the server portion of the client-server arrangement. The operation and structure of this software is further described with reference to FIG. 5.

Figure 5:
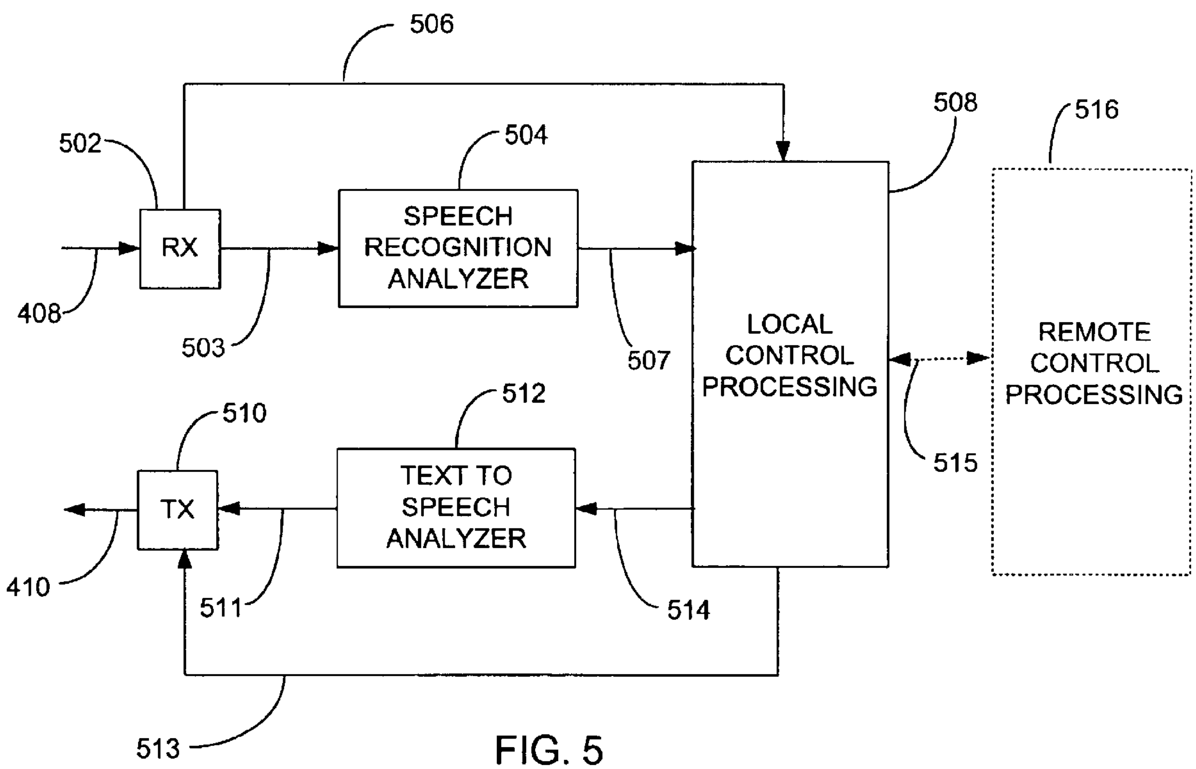
FIG. 5 is a schematic illustration of voice and data processing functionality within a speech recognition server in accordance with the present invention.

FIG. 5 illustrates an implementation of speech recognition and synthesis server functions. Cooperating with at least one speech recognition client, the speech recognition server functionality illustrated in FIG. 5 provides a speech recognition element. Data from a subscriber unit arrives via the receive path 408 at a receiver (RX) 502. The receiver decodes the data and routes speech recognition data 503 from the speech recognition client to a speech recognition analyzer 504. Other information 506 from the subscriber unit, such as device status information, device capabilities, and information related to barge-in context, is routed by the receiver 502 to a local control processor 508. In one embodiment, the other information 506 includes an indication from the subscriber unit that a portion of a speech recognition element (e.g., a speech recognition client) has been activated. Such an indication can be used to initiate speech recognition processing in the speech recognition server.

As part of a client-server speech recognition arrangement, the speech recognition analyzer 504 takes speech recognition parameter vectors from a subscriber unit and completes recognition processing. Recognized words or utterances 507 are then passed to the local control processor 508. A description of the processing required to convert parameter vectors to recognized utterances can be found in Lee et al. "Automatic Speech Recognition: The Development of the Sphinx System", 1988, the teachings of which publication are herein incorporated by this reference. As mentioned above, it is also understood that rather than receiving parameter vectors from the subscriber unit, the server (that is, the speech recognition analyzer 504) may receive speech information that is not parameterized. Again, the speech information may take any of a number of forms as described above. In this case, the speech recognition analyzer 504 first parameterizes the speech information using, for example, the mel cepstra technique. The resulting parameter vectors may then be converted, as described above, to recognized utterances.

The local control processor 508 receives the recognized utterances 507 from the speech recognition analyzer 504 and other information 508. Generally, the present invention requires a control processor to operate upon the recognized utterances and, based on the recognized utterances, provide control signals. In a preferred embodiment, these control signals are used to subsequently control the operation of a subscriber unit or at least one device coupled to a subscriber unit. To this end, the local control processor may preferably operate in one of two manners. First, the local control processor 508 can implement application programs. One example of a typical application is an electronic assistant as described in U.S. Pat. No. 5,652,789. Alternatively, such applications can run remotely on a remote control processor 516. For example, in the system of FIG. 1, the remote control processor would comprise the control entity 116. In this case, the local control processor 508 operates like a gateway by passing and receiving data by communicating with the remote control processor 516 via a data network connection 515. The data network connection 515 may be a public (e.g., Internet), a private (e.g., Intranet), or some other data communications link. Indeed, the local control processor 508 may communicate with various remote control processors residing on the data network dependent upon the application/service being utilized by a user.

The application program running either on the remote control processor 516 or the local control processor 508 determines a response to the recognized utterances 507 and/or the other information 506. Preferably, the response may comprise a synthesized message and/or control signals. Control signals 513 are relayed from the local control processor 508 to a transmitter (TX) 510. Information 514 to be synthesized, typically text information, is sent from the local control processor 508 to a text-to-speech analyzer 512. The text-to-speech analyzer 512 converts the input text string into a parametric speech representation. A suitable technique for performing such a conversion is described in Sproat (editor), "Multilingual Text-To-Speech Synthesis: The Bell Labs Approach", 1997, the teachings of which publication are incorporated herein by this reference. The parametric speech representation 511 from the text-to-speech analyzer 512 is provided to the transmitter 510 that multiplexes, as necessary, the parametric speech representation 511 and the control information 513 over the transmit path 410 for transmission to a subscriber unit. Operating in the same manner just described, the text-to-speech analyzer 512 may also be used to provide synthesized prompts or the like to be played as an output audio signal at a subscriber unit.

Figure 6:
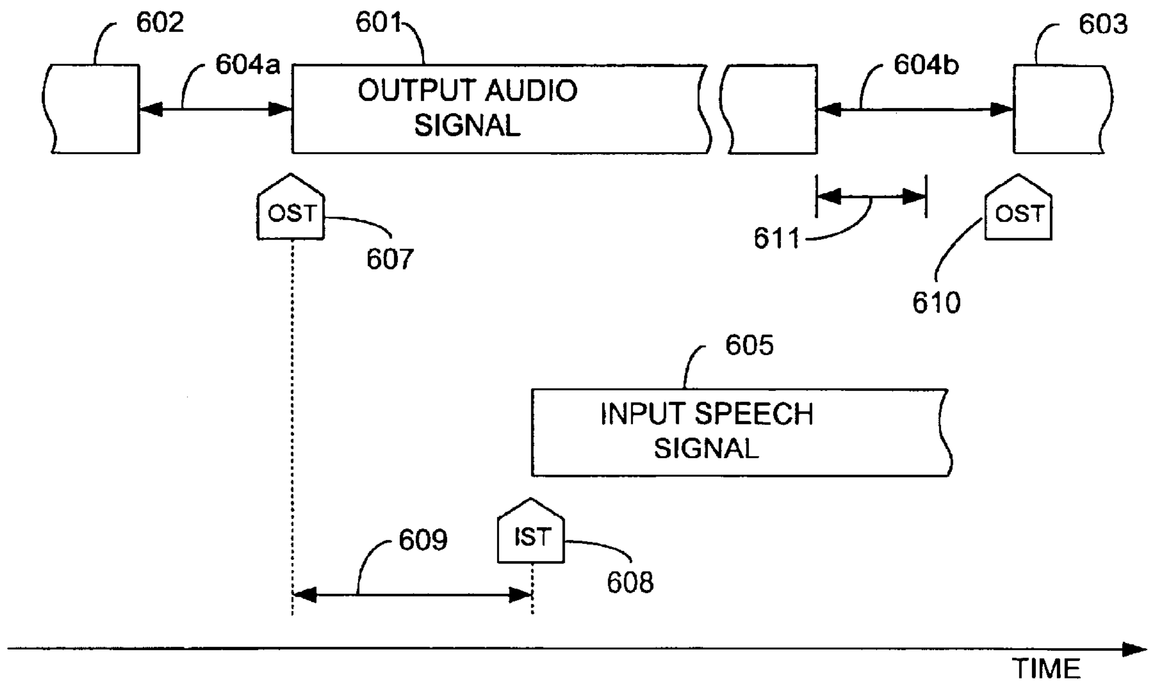
FIG. 6 illustrates context determination in accordance with the present invention.

Context determination in accordance with the present invention is illustrated in FIG. 6. It should be noted that the point of reference for the activity illustrated in FIG. 6 is that of a subscriber unit. That is, FIG. 6 illustrates the time-progression of audible signals to and from a subscriber unit. In particular, the progression through time of an output audio signal 601 is illustrated. The output audio signal 601 may be proceeded by a prior output audio signal 602 separated by a first period of output silence 604*a*, and may be followed by a subsequent output audio signal 603 separated by a second period of output silence 604*b*. The output audio signal 601 may comprise any audio signal, such as a speech signal, a synthesized speech signal or prompt, audible tones or beeps or the like. In one embodiment of the present invention, each output audio signal 601–603 has an associated unique identifier assigned to it to aid in identifying what signal is being output at any given moment in time. Such identifiers may be pre-assigned to various output audio signals (e.g., synthesized prompts, tones, etc.) in non-real time or created and assigned in real time. Further, the identifiers themselves may be transmitted along with the information used to provide the output audio signals, for example, using in-band or out-of-band signaling. Alternatively, in the case of pre-assigned identifiers, the identifier itself can be provided to a subscriber unit and, based on the identifier, the subscriber unit can synthesize the output audio signal. Those having ordinary skill in the art will recognize that a variety of techniques for providing and using identifiers for output audio signals may be readily devised and applied to the present invention.

As shown, an input speech signal 605 arises at some point in time relative to the presentation of the output audio signal 601. This would be the case, for example, where the output audio signals 601–603 are a series of synthesized speech prompts and the input speech signal 605 is a user's response to any one of the speech prompts. Likewise, the output audio signals can also be non-synthesized speech signals communicated to the subscriber unit. Regardless, the input speech signal is detected and an input start time 608 is established to memorialize the start of the input speech signal 605. Various techniques exist for determining the start of an input speech signal. One such method is described in U.S. Pat. No. 4,821,325. Any method used to determine the start of an input speech signal should preferably be able to discriminate the start with a resolution of better than 1/20 of a second.

The start of an input speech signal can be detected at any time between two successive output start times 607, 610, giving rise to an interval 609 representative of the precise point at which the input speech signal was detected relative to the output audio signal. Thus, the start of the input speech signal can be validly detected at any point during the presentation of an output audio signal, which may optionally include a period of silence (i.e., when no output audio signal is being provided) following that output audio signal. Alternatively, a time-out period 611 of arbitrary length following the termination of the output audio signal may be used to demarcate the end of the presentation of the output audio signal. In this manner, the start of input speech signals can be associated with individual output audio signals. It is understood that other protocols for establishing valid detection periods could be established. For example, where a series of output prompts are all related to each other, the valid detection period could begin with the first output start time for the series of prompts, and end with a time-out period after the last prompt in the series, or with the first output start time for an output audio signal immediately following the series.

The same method used to detect the input start time may be used to establish output start times 607, 610. This is particularly true for those instances in which the output audio signal is a speech signal provided directly from the infrastructure. Where the output audio signal is, for example, a synthesized prompt or other synthesized output, the output start time may be ascertained more directly through the use of clock cycles, sample boundaries or frame boundaries, as described in greater detail below. Regardless, the output audio signal establishes a context against which the input speech signal can be processed.

As noted above, each output audio signal may have associated therewith an identification, thereby providing differentiation between output audio signals. Thus, as an alternative to determining when an input speech signal started relative to the context of an output audio signal, it is also possible to use the identification of the output audio signal alone as a means to describe the context of the input speech signal. This would be the case, for example, where it is not important to know the precise time at which an input speech signal began in relation to the output audio signal, only that the input speech signal did in fact begin at some time during the presentation of the output audio signal. It is further understood that such output audio signal identifications may be used in conjunction with, as opposed to the exclusion of, the determination of input audio start times.

Regardless of whether input start times and/or output audio signal identifications are used, the present invention enables accurate context determination in those systems having uncertain delay characteristics. Methods for implementing and using the context determination techniques described above are further illustrated with reference to FIGS. 7 and 8.

Figure 7:
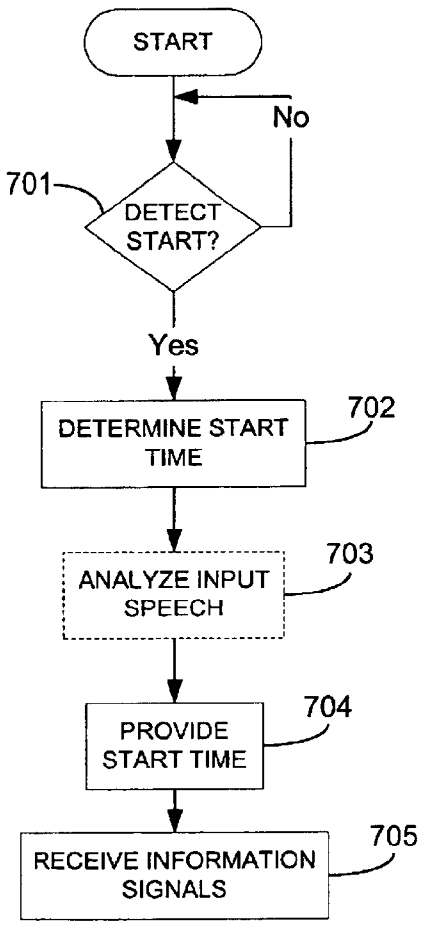
FIG. 7 is a flow chart illustrating a method for processing an input speech signal during presentation of an output audio signal in accordance with the present invention.

FIG. 7 illustrates a method, preferably implemented within a subscriber unit, for processing an input speech signal during presentation of an output audio signal. For example, the method illustrated in FIG. 7 is preferably implemented using stored software routines and algorithms executed by a suitable platform, such as the CPU 201 and/or the DSP 202 illustrated in FIG. 2. It is understood that other devices, such as a networked computer, could be used to implement the steps illustrated in FIG. 7, and that some or all of the steps shown in FIG. 7 could be implemented using specialized hardware devices, such as gate arrays or customized integrated circuits.

During presentation of an output audio signal, it is continuously determined, at step 701, whether the start of an input speech signal has been detected. Again, a variety of techniques for determining the start of a speech signal are known in the art and may be equally employed by the present invention as a matter of design choice. In a preferred embodiment, a valid period for detecting the start of an input speech signal begins no sooner than the start of the output audio signal and terminates either with the start of a subsequent output audio signal or with the expiration of a time-out timer initiated at the conclusion of the current output audio signal. When a start of an input speech signal is detected, an input start time relative to the context established by the output audio signal is determined at step 702. Any of a variety of techniques for determining the input start time may be employed. In one embodiment, a real-time reference may be maintained, for example, by the CPU 201 (using any convenient time base such as seconds or clock cycles) thereby establishing a temporal context. In this case, the input start time is represented as a time stamp relative to the output audio signal's context. In another embodiment, audible signals are reconstructed and/or encoded on a sample-by-sample basis. For example, in a system using an 8 kHz audio sampling rate, each audio sample would correspond to 125 microseconds of audio input or output. Thus, any point in time (i.e., the input start time) may be represented by an index of an audio sample relative to a beginning sample of the output audio signal (a sample context). In this case, the input start time is represented as a sample index relative to the first sample of the output audio signal. In yet another embodiment, audible signals are reconstructed on a frame-by-frame basis, each frame comprising multiple sample periods. In this method, the output audio signal establishes a frame context, and the input start time would be represented as a frame index within the frame context. Regardless of how the input start time is represented, the input start time memorializes, with varying degrees of resolution, exactly when the input speech signal began with respect to the output audio signal.

At least from the detection of the start of the input speech signal, the input speech signal can be optionally analyzed in order to provide a parameterized speech signal, as represented by step 703. Specific techniques for the parameterization of speech signals were discussed above relative to FIG. 3. At step 704, at least the input start time is provided for responding to the input speech signal. When the method of FIG. 7 is implemented within a wireless subscriber unit, this step encompasses the wireless transmission of the input start time to a speech recognition/synthesis server.

Finally, at step 705, information signals are optionally received in response to at least the input start time and, when provided, to the parameterized speech signal. In the context of the present invention, such "information signals" include data signals that a subscriber unit may operate upon. For example, such data signals may comprise display data for generating a user display or a telephone number that the subscriber unit can automatically dial. Other examples are readily identifiable by those having ordinary skill in the art. The "information signals" of the present invention may also comprise control signals used to control operation of a subscriber unit or any device coupled to the subscriber unit. For example, a control signal can instruct the subscriber unit to provide location data or a status update. Again, those having ordinary skill in the art may devise many types of control signals. A method for the provision of such information signals by a speech recognition server is further described with reference to FIG. 9. However, an alternate embodiment for processing an input speech signal is further illustrated with regard to FIG. 8.

Figure 8:
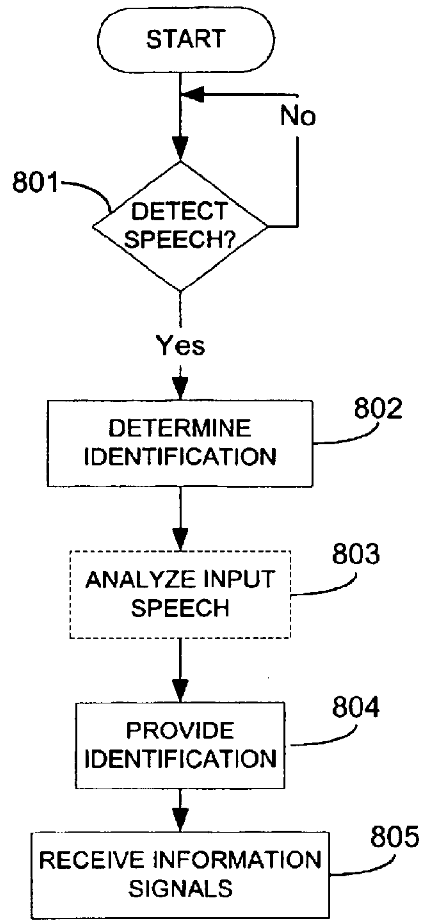
FIG. 8 is a flow chart illustrating another method for processing an input speech signal during presentation of an output audio signal in accordance with the present invention.

The method of FIG. 8 is preferably implemented within a subscriber unit using stored software routines and algorithms executed by a suitable platform, such as the CPU 201 and/or the DSP 202 illustrated in FIG. 2. Other devices, such as a networked computer, could be used to implement the steps illustrated in FIG. 8, and some or all of the steps shown in FIG. 8 can be implemented using specialized hardware devices, such as gate arrays or customized integrated circuits.

During presentation of an output audio signal, it is continuously determined, at step 801, whether an input speech signal has been detected. A variety of techniques for determining the presence of a speech signal are known in the art and may be equally employed by the present invention as a matter of design choice. Note that the technique illustrated in FIG. 8 is not particularly concerned with detecting the start of the input speech signal, although such a determination may be included in the step of detecting the presence of the input speech signal.

At step 802, an identification corresponding to the output audio signal is determined. As noted above with regard to FIG. 6, the identification may be separate from or incorporated into the output audio signal. Most importantly, the output audio signal identification must uniquely differentiate the output audio signal from all other output audio signals. In the case of synthesized prompts and the like, this can be achieved by assigning each such synthesized prompt a unique code. In the case of real-time speech, a non-repetitive code, such as an infrastructure-based time stamp, may be used. Regardless of how the identification is represented, it must be ascertainable by the subscriber unit.

Step 803 is equivalent to step 703 and need not be discussed in further detail At step 804, the identification is provided for responding to the input speech signal. When the method of FIG. 8 is implemented within a wireless subscriber unit, this step encompasses the wireless transmission of the identification to a speech recognition/synthesis server. In a manner essentially identical to step 705, the subscriber unit can receive information signals, based at least upon the identification, from an infrastructure at step 805.

Figure 9:
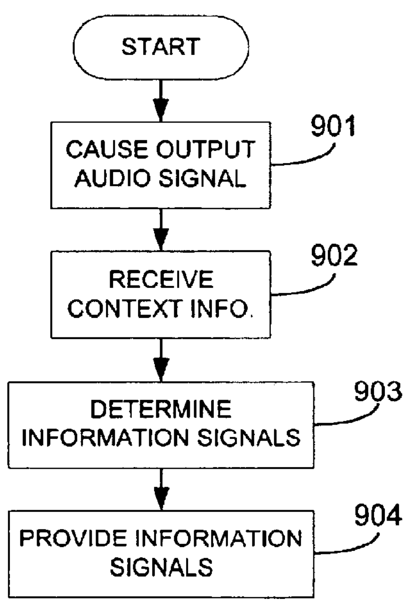
FIG. 9 is a flow chart illustrating a method that may be implemented within a speech recognition server in accordance with the present invention.

FIG. 9 illustrates a method for the provision of information signals by a speech recognition server. Except where noted, the method illustrated in FIG. 9 is preferably implemented using stored software routines and algorithms executed by a suitable platform or platforms, such as the CPU 401 and/or remote control processor 516 illustrated in FIGS. 4 and 5. Again, other software and/or hardware-based implementations are possible as a matter of design choice.

At step 901, the speech recognition server causes an output audio signal to be provided at a subscriber unit. This could be achieved, for example, by providing control signals to the subscriber unit instructing the subscriber unit to synthesize a uniquely identified speech prompt or series of prompts. Alternatively, a parametric speech representation provided, for example, by the text-to-speech analyzer 512, can be sent to the subscriber unit for subsequent reconstruction of a speech signal. In one embodiment of the present invention, real-time speech signals are provided by the infrastructure in which the speech recognition server resides (with or without the intervention of the speech recognition server). This would be the case, for example, where the subscriber unit is engaged in a voice communication with another party via the infrastructure.

Regardless of the technique used to cause the output audio signal at the subscriber unit, context information of the type described above (input start time and/or output audio signal identifier) is received at step 902. In a preferred technique, both the input start time and the output audio signal identifier are provided, along with a parameterized speech signal corresponding to the input speech signal.

At step 903, based at least upon the contextual information, information signals comprising control signals and/or data signals to be conveyed to the subscriber device are determined. Referring again to FIG. 5, this is preferably accomplished by the local control processor 508 and/or the remote control processor 516. At a minimum, the contextual information is used to establish a context for the input speech signal relative to the output audio signal. The context can be used to determine whether the input speech signal was in response to the output audio signal used to determine the interval. The unique identifier corresponding to a particular output audio signal is preferably used to establish the context where ambiguity is possible as to which particular output audio signal established the context for the input speech signal. This would be the case, for example, where the user is trying to place a phone call to someone in a phone directory. The system could supply several possible names of persons to call via the audio output. The user could interrupt the output audio with a command such as "call." The system can then determine, based on the unique identifier, and or input start time, which name was being output when the user interrupted, and place the call to the phone number associated with that name. Furthermore, having established the context, a parameterized speech signal, if provided, can be analyzed to provide recognized utterances. The recognized utterances, in turn, are used to ascertain the control signals or data signals, if any are needed to respond to the input speech signal. If any control or data signals are determined at step 903, they are provided to the source of the contextual information at step 904.

The present invention as described above provides a unique technique for processing an input speech signal during presentation of an output audio signal. A proper context for the input speech signal is established through the use of input start times and/or output audio signal identifiers. In this manner, greater certainty is provided that information signals sent to the subscriber unit are properly responsive to the input speech signals. What has been described above is merely illustrative of the application of the principles of the present invention. Other arrangements and methods can be implemented by those skilled in the art without departing from the spirit and scope of the present invention.

What is claimed is:

1. A method for processing an input speech signal during presentation of an output audio signal, the method comprising steps of:

detecting a start of the input speech signal;

determining, relative to the output audio signal, an input start time of the start of the input speech signal; and providing the input start time to establish a context in responding to the input speech signal.

2. The method of claim 1, wherein the input start time comprises any one of a time stamp relative to a temporal context of the output audio signal, a sample index relative to a sample context of the output audio signal, and a frame index relative to a frame context of the output audio signal.

3. A computer-readable medium having computer-executable instructions for performing the steps recited in claim 1.

4. A method for processing an input speech signal during presentation of an output audio signal, the method comprising steps of:

detecting the input speech signal;

determining an identification corresponding to the output audio signal; and providing the identification to establish a context in responding to the input speech signal.

5. A computer-readable medium having computer-executable instructions for performing the steps recited in claim 4.

6. In a subscriber unit in wireless communication with an infrastructure comprising a speech recognition server, the subscriber unit comprising a speaker and a microphone, wherein the speaker provides an output audio signal and the microphone provides an input speech signal, a method for processing the input speech signal, the method comprising steps of:

detecting a start of the input speech signal during presentation of the output speech signal;

determining, relative to the output audio signal, an input start time of the start of the input speech signal; and providing the input start time to the speech recognition server as a control parameter.

7. The method of claim 6, further comprising a step of:

receiving at least one information signal from the speech recognition server based at least in part upon the input start time.

8. The method of claim 6, the step of determining the input start time further comprising the steps of:

determining the input start time no earlier than a start of the output audio signal and no later than a start of a subsequent output audio signal.

9. The method of claim 6, wherein the input start time is any one of a time stamp relative to a temporal context of the output audio signal, a sample index relative to a sample context of the output audio signal, and a frame index relative to a frame context of the output audio signal.

10. The method of claim 6, wherein the output audio signal comprises a speech signal provided by the infrastructure.

11. The method of claim 6, wherein the output audio signal comprises a speech signal synthesized by the subscriber unit in response to control signaling provided by the infrastructure.

12. The method of claim 6, further comprising steps of:

analyzing the input speech signal to provide a parameterized speech signal;

providing the parameterized speech signal to the speech recognition server; and receiving at least one information signal from the speech recognition server based at least in part upon the input start time and the parameterized speech signal.

13. In a subscriber unit in wireless communication with an infrastructure comprising a speech recognition server, the subscriber unit comprising a speaker and a microphone, wherein the speaker provides an output audio signal and the microphone provides an input speech signal, a method for processing the input speech signal, the method comprising steps of:

detecting the input speech signal during presentation of the output audio signal;

determining an identification corresponding to the output audio signal; and providing the identification to the speech recognition server as a control parameter.

14. The method of claim 13, further comprising a step of:

receiving at least one information signal from the speech recognition server based at least in part upon the identification.

15. The method of claim 13, wherein the output audio signal comprises a speech signal provided by the infrastructure.

16. The method of claim 13, wherein the output audio signal comprises a speech signal synthesized by the subscriber unit in response to control signaling provided by the infrastructure.

17. The method of claim 13, further comprising steps of:

analyzing the input speech signal to provide a parameterized speech signal; providing the parameterized speech signal to the speech recognition server; and receiving at least one information signal from the speech recognition server based at least in part upon the identification and the parameterized speech signal.

18. In a speech recognition server forming a part of an infrastructure that wirelessly communicates with one or more subscriber units, a method for providing information signals to a subscriber unit of the one or more subscriber units, the method comprising steps of:

causing an output audio signal to be presented at the subscriber unit;

receiving, from the subscriber unit, at least an input start time corresponding to a start of an input speech signal relative to the output audio signal at the subscriber unit; and responsive at least in part to the input start time, providing the information signals to the subscriber unit.

19. The method of claim 18, wherein the input start time is any one of a time stamp relative to a temporal context of the output audio signal, a sample index relative to a sample context of the output audio signal, and a frame index relative to a frame context of the output audio signal.

20. The method of claim 18, wherein the step of causing the output audio signal further comprises a step of:

providing a speech signal to the subscriber unit.

21. The method of claim 18, the step of providing the information signals further comprising a step of:

directing the information signals to the subscriber unit, wherein the information signals control operation of the subscriber unit.

22. The method of claim 18, wherein the subscriber unit is coupled to at least one device, the step of providing the information signals further comprising a step of:

directing the information signals to the at least one device, wherein the information signals control operation of the at least one device.

23. The method of claim 18, wherein the step of causing the output audio signal further comprises a step of:

providing control signaling to the subscriber unit, wherein the control signaling causes the subscriber unit to synthesize a speech signal as the output audio signal.

24. The method of claim 18, further comprising steps of:

receiving a parameterized speech signal corresponding to the input speech signal; and responsive at least in part to the input start time and the parameterized speech signal, providing the information signals to the subscriber unit.

25. In a speech recognition server forming a part of an infrastructure that wirelessly communicates with one or more subscriber units, a method for providing information signals to a subscriber unit of the one or more subscriber units, the method comprising steps of:

causing an output audio signal to be presented at the subscriber unit, wherein the output audio signal has a corresponding identification;

receiving, from the subscriber unit, at least the identification when an input speech signal is detected at the subscriber unit during presentation of the output audio signal; and responsive at least in part to the identification, providing the information signals to the subscriber unit.

26. The method of claim 25, wherein the step of causing the output audio signal further comprises a step of:

providing a speech signal to the subscriber unit.

27. The method of claim 25, the step of providing the information signals further comprising a step of:

directing the information signals to the subscriber unit, wherein the information signals control operation of the subscriber unit.

28. The method of claim 25, wherein the subscriber unit is coupled to at least one device, the step of providing the information signals further comprising a step of:

directing the information signals to the at least one device, wherein the information signals control operation of the at least one device.

29. The method of claim 25, wherein the step of causing the output audio signal further comprises a step of:

providing control signaling to the subscriber unit, wherein the control signaling causes the subscriber unit to synthesize a speech signal as the output audio signal.

30. The method of claim 25, further comprising steps of:

receiving a parameterized speech signal corresponding to the input speech signal; and responsive at least in part to the identification and the parameterized speech signal, providing the information signals to the subscriber unit.

31. A subscriber unit that wirelessly communicates with an infrastructure comprising a speech recognition server, the subscriber unit comprising a speaker and a microphone, wherein the speaker provides an output audio signal and the microphone provides an input speech signal, the subscriber unit further comprising:

means for detecting a start of the input speech signal;

means for determining, relative to the output audio signal, an input start time of the start of the input speech signal; and means for providing the input start time to the speech recognition server as a control parameter.

32. The subscriber unit of claim 31, further comprising:

means for receiving at least one control signal from the speech recognition server based at least in part upon the input start time.

33. The subscriber unit of claim 32, further comprising:

means for analyzing the input speech signal to provide a parameterized speech signal, wherein the means for providing also provides the parameterized speech signal to the speech recognition server, and the means for receiving also receives the at least one control signal from the speech recognition server based at least in part upon the input start time and the parameterized speech signal.

34. The subscriber unit of claim 31, wherein the means for determining the input start time function to determine the input start time no earlier than a start of the output audio signal and no later than a start of a subsequent output audio signal.

35. The subscriber unit of claim 31, wherein the input start time is any one of a time stamp relative to a temporal context of the output audio signal, a sample index relative to a sample context of the output audio signal, and a frame index relative to a frame context of the output audio signal.

36. The subscriber unit of claim 31, further comprising:

means for receiving, from the infrastructure, a speech signal to be provided as the output audio signal.

37. The subscriber unit of claim 31, further comprising:

means for receiving, from the infrastructure, control signaling regarding the output audio signal; and means for synthesizing a speech signal as the output audio signal in response to the control signaling.

38. A subscriber unit that wirelessly communicates with an infrastructure comprising a speech recognition server, the subscriber unit comprising a speaker and a microphone, wherein the speaker provides an output audio signal and the microphone provides an input speech signal, the subscriber unit further comprising:

means for detecting the input speech signal during presentation of the output audio signal;

means for determining an identification corresponding to the output audio signal; and means for providing the identification to the speech recognition server as a control parameter.

39. The subscriber unit of claim 38, further comprising:

means for receiving at least one control signal from the speech recognition server based at least in part upon the identification.

40. The subscriber unit of claim 39, further comprising:

means for analyzing the input speech signal to provide a parameterized speech signal, wherein the means for providing also provides the parameterized speech signal to the speech recognition server, and the means for receiving also receives the at least one control signal from the speech recognition server based at least in part upon the identification and the parameterized speech signal.

41. The subscriber unit of claim 38, further comprising:

means for receiving, from the infrastructure, a speech signal to be provided as the output audio signal.

42. The subscriber unit of claim 38, further comprising:

means for receiving, from the infrastructure, control signaling regarding the output audio signal; and means for synthesizing a speech signal as the output audio signal in response to the control signaling.

43. A speech recognition server forming a part of an infrastructure that wirelessly communicates with one or more subscriber units, the speech recognition server further comprising:

means for causing an output audio signal to be presented at a subscriber unit of the one or more subscriber units;

means for receiving, from the subscriber unit, at least an input start time corresponding to a start of an input speech signal relative to the output audio signal at the subscriber unit; and means, responsive at least in part to the input start time, for providing information signals to the subscriber unit.

44. The speech recognition server of claim 43, wherein the input start time is any one of a time stamp relative to a temporal context of the output audio signal, a sample index relative to a sample context of the output audio signal, and a frame index relative to a frame context of the output audio signal.

45. The speech recognition server of claim 43, wherein the means for providing the information signals further functions to direct the information signals to the subscriber unit, wherein the information signals control operation of the subscriber unit.

46. The method of claim 43, wherein the subscriber unit is coupled to at least one device, and wherein the means for providing the information signals further functions to direct the information signals to the at least one device, wherein the information signals control operation of the at least one device.

47. The speech recognition server of claim 43, wherein the means for causing the output audio signal further function to provide a speech signal to be provided as the output audio signal.

48. The speech recognition server of claim 43, wherein the means for causing the output audio signal further function to provide control signaling to the subscriber unit, wherein the control signaling causes the subscriber unit to synthesize a speech signal as the output audio signal.

49. The speech recognition server of claim 43, the means for receiving further functioning to receive a parameterized speech signal corresponding to the input speech signal, and the means for providing further functioning to provide the information signals to the subscriber unit responsive at least in part to the input start time and the parameterized speech signal.

50. A speech recognition server forming a part of an infrastructure that wirelessly communicates with one or more subscriber units, the speech recognition server further comprising:

means for causing an output audio signal to be presented at a subscriber unit of the one or more subscriber units, wherein the output audio signal has a corresponding identification;

means for receiving, from the subscriber unit, at least the identification when an input speech signal is detected at the subscriber unit during presentation of the output audio signal; and means, responsive at least in part to the identification, for providing information signals to the subscriber unit.

51. The speech recognition server of claim 50, wherein the means for causing the output audio signal further function to provide a speech signal to be provided as the output audio signal.

52. The speech recognition server of claim 50, wherein the means for causing the output audio signal further function to provide control signaling to the subscriber unit, wherein the control signaling causes the subscriber unit to synthesize a speech signal as the output audio signal.

53. The speech recognition server of claim 50, the means for receiving further functioning to receive a parameterized speech signal corresponding to the input speech signal, and the means for providing further functioning to provide the information signals to the subscriber unit responsive at least in part to the input start time and the parameterized speech signal.

54. The speech recognition server of claim 50, wherein the means for providing the information signals further functions to direct the information signals to the subscriber unit, wherein the information signals control operation of the subscriber unit.

55. The method of claim 50, wherein the subscriber unit is coupled to at least one device, and wherein the means for providing the information signals further functions to direct the information signals to the at least one device, wherein the information signals control operation of the at least one device.

* * * * *